Patented July 8, 1952

2,602,794

UNITED STATES PATENT OFFICE 2,602,794

PROCESS FOR PREPARATION OF 4-AMINO-5-ARYLPYRIMIDINES

George H. Hitchings, Tuckahoe, Peter B. Russell, Crestwood, and Elvira A. Falco, New Rochelle, N. Y., assignors to Burroughs Wellcome & Co. (U. S. A.) Inc., Tuckahoe, N. Y., a corporation of New York No Drawing. Application June 14, 1950, Serial No. 168,156

9 Claims. (Cl. 260—256.4)

This invention deals with a new process for the preparation of 4-amino-5-arylpyrimidines. This process is a marked improvement in the preparation of certain of these substances, such as 2,4 - diamino - 5 - p - chlorophenylpyrimidine, which previously could be prepared only indirectly. More important, however, is the fact that it makes accessible a large number of substances, such as 2,4 - diamino - 5 - phenyl - 6 - alkylpyrimidines, which hitherto could not be prepared at all by the methods known in the art.

This application is a continuation in part of application Serial Number 144,394 filed February 15, 1950.

The process of the present invention consists in the condensation of a beta-alkoxy-alpha-arylacrylonitrile (I) (which may also be named as alpha-alkoxymethylenearylacetonitriles) with a suitable urea derivative (II) such as guanidine, ($X=NH_2$) and amidines ($X=H$, alkyl or aryl) to give 2-substituted-4-amino-5-aryl-6-substituted pyrimidines (III). This reaction may be illustrated by the following general formulas:

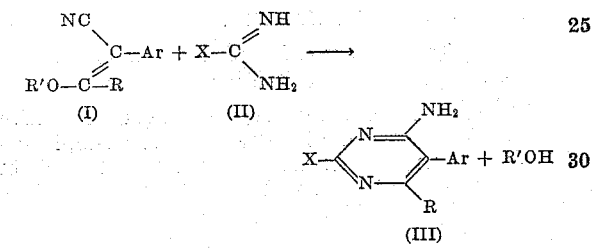

wherein X is a member of the group consisting of hydrogen, amino, alkyl and aryl radicals; Ar is an aryl radical, R is selected from the group consisting of hydrogen, aryl and alkyl radicals and R' is an alkyl group. The scope of this reaction will be illustrated by the specific examples given below.

The essence of the invention is the discovery that whereas the beta - hydroxy - alpha - arylacrylonitriles (which may also be called alpha-acylacetonitriles, the two forms being tautomeric) condense very poorly or fail entirely to react with the urea derivatives, the corresponding alkoxymethylene derivatives (beta - alkoxy - alpha-arylacrylonitriles) condense smoothly to give the desired pyrimidines in good yield. For the purposes of this process it is unnecessary to isolate the alkoxy derivative, and for convenience this is usually avoided. It is often preferred to carry out the alkylation with diazomethane in ethereal solution, to evaporate the ether and without purification of the product to react it with a functional derivative of urea. Since the alkyl group R' is eliminated in the cyclization, its nature is not significant in the reaction. All lower alkyl groups are considered equivalent and preference is dictated solely by convenience and availability.

As indicated below it is preferred to prepare the beta-alkoxy-alpha-arylacrylonitriles (VIII) from the corresponding hydroxymethylene derivatives (VII) although in some instances the alkoxymethylene derivative may be obtained directly from the arylacetonitriles. The arylacetonitriles (V) are conveniently synthesized from arylmethylhalides (IV) by reaction with alkali cyanides. The alpha-oxymethylene derivatives (VII) may be prepared by reaction of the arylacetonitriles with the appropriate esters (VI) in the presence of an alkali alkoxide. These reactions are shown in the following formulas:

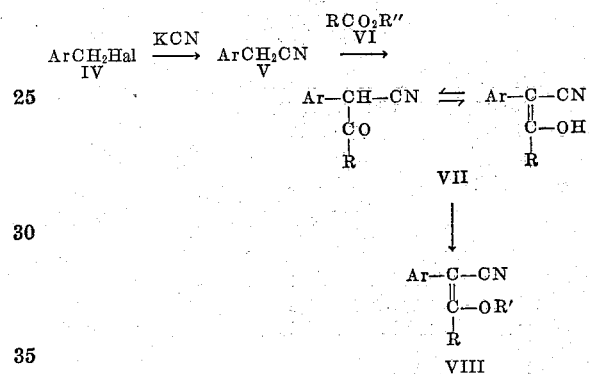

The beta-alkoxyacrylonitriles (VIII) may be prepared in a variety of ways from the alpha-acylarylacetonitriles. However, the use of ordinary alkylating reagents such as alkyl halides and dialkylsulfates usually results in an inferior yield of the pyrimidine. The preferred method of preparation of the beta-alkoxyacrylonitrile is the treatment of the acyl derivative with diazomethane to produce the beta-methoxy-acrylonitrile, but in some instances it is equally satisfactory to heat the alpha-formylacetonitrile with an orthoester. Although the method of preparation of the alkoxy derivative is incidental to the invention the use of several procedures will be illustrated in the examples given below.

The products prepared by the process of the present invention have varied and useful applications in the pharmaceutical industry. Members of this group have been found to have chemotherapeutic activity against malarial organisms, antibacterial action and useful pharmacological properties. Furthermore certain of these new compositions are useful intermediates in the preparation of pharmaceutical agents, and certain of them have uses in veterinary medicine.

The examples which follow will illustrate the teachings of the art but in no way limit the invention, the scope of which is defined in the claims.

EXAMPLE 1

*2,4-diamino-5-phenylpyrimidine from alpha-formylphenylacetonitrile and guanidine*

The importance of o-alkylation and the use of various alkylating agents in the preparation of beta-alkoxy-alpha-phenylacrylonitrile may be illustrated as follows:

Guanidine (from guanidine hydrochloride and sodium ethylate) was heated in alcoholic solution with alpha-formylphenylacetonitrile, and the products of reaction of the latter with various alkylating agents, under reflux condenser for 3 to 6 hours. The 2,4-diamino-5-phenylpyrimidine was isolated and weighed.

| Alkylating Reagent, None | Yield of Diaminophrimidine, Negligible |
|---|---|
| | Per Cent |
| Dimethylsulfate | 5 |
| Methyl iodide | 11 |
| Ethyl bromide | 13.5 |
| Diazomethane | 60 |
| Ethylorthoformate | 60 |
| Ethylortho-n-propionate | 57 |

EXAMPLE 2

*2,4-diamino-5-p-chlorophenyl-6-methyl-pyrimidine*

The direct condensation of guanidine with alpha-acetyl-p-chlorophenylacetonitrile, or with ethyl-alpha-acetyl-p-chlorophenylacetate failed to give either the 2,4-diamino or the 2-amino-4-hydroxypyrimidine in appreciable quantity.

Alpha - acetyl - p-chlorophenylacetonitrile (9.7 g.) was treated with diazomethane (from 10 g. nitrosomethylurea) in ether (250 ml.). After standing overnight at room temperature the ether was evaporated and replaced by absolute ethanol (50 ml.). To this was added a solution of guanidine (from 4.6 g. of guanidine hydrochloride and 1.2 g. of sodium in 50 ml. alcohol) and the mixture was heated under a reflux condenser for 12 hours on the steam bath. The alcohol was evaporated, 5N sodium hydroxide solution was added and the mixture was filtered. The residue was purified by solution in dilute aqueous acetic acid, treatment with charcoal, and reprecipitation with sodium hydroxide. After recrystallization from aqueous ethanol the 2,4 - diamino-5-p-chlorophenyl-6-methylpyrimidine melted at 264–5°. Yield, about 60%.

The identical compound was also prepared in the same way by the condensation of guanidine with beta - ethoxy-beta-methyl-alpha-p-chlorophenylacrylonitrile (alpha-(methylethoxymethylene)-p-chlorophenylacetonitrile). After purification, as above, the compound melted at 264–5°. The yield was about 70% calculated from alpha-formyl-p-chlorophenylacetonitrile.

EXAMPLE 3

*Preparation of 2,4-diamino-5-p-chlorophenyl-6-ethylpyrimidine*

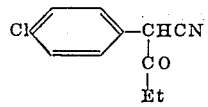

Alpha-propionyl-p-chlorophenylacetonitrile p-Chlorophenylacetonitrile (36.5 g.) and ethyl propionate (25.5 g.) were added to a solution of sodium ethoxide (from 5.75 gm. sodium) in absolute ethanol (150 ml.). The solution was heated on a steam bath for 6 hours. After cooling, the whole was poured into water and the oil extracted well with ether, the ether solution was discarded and the aqueous solution neutralized with 1 N sulfuric acid. A heavy oil separated which was taken into ether, washed with water, bicarbonate solution and again with water. After drying, the ether was removed to give a thick oil which solidified on standing (34.6 g.). After recrystallization from ether: petroleum ether mixture it formed needles, M. P. 108°–112°. (Found: N—6.5% $C_{11}H_{10}ONCl$ requires N 6.7%).

The above keto-nitrile (15 gms.) was methylated with diazomethane in ether. (The diazomethane solution was prepared from N nitrosomethylurea (20 g.) as previously described). The ether and excess diazomethane were evaporated on the steam bath and the oil dissolved in ethanol (50 ml.). To this was added a solution of guanidine in ethanol (100 ml.) (prepared from 8.1 gm. of the hydrochloride). The solution was refluxed for 5 hours, the alcohol removed and the residue treated with 5 N sodium hydroxide. The insoluble material was then filtered. After purification by precipitation from dilute acetic acid with sodium hydroxide and by recrystallization from ethanol the product formed clear colorless needles (8.0 g.), M. P. 218°–220°. (Found: C, 58.0; H, 5.1; N, 22.1. $C_{12}H_{13}N_4Cl$ requires: C, 57.9; H, 5.2; N, 22.5.)

EXAMPLE 4

*2,4-diamino-5-p-chlorophenyl-6-n-propyl-pyrimidine*

This compound was prepared exactly as above from beta - methoxy - beta - n - propyl-alpha-p-chlorophenylacrylonitrile. It was obtained in 56% yield and after recrystallization from alcohol melted at 171°–174°.

EXAMPLE 5

*2,4-diamino-5-p-chlorophenyl-6-isobutyl-pyrimidine*

This compound was prepared as before from beta - methoxy - beta - isobutyl-alpha-p-chlorophenylacrylonitrile. It formed colorless prisms from benzene, M. P. 147–148°.

EXAMPLE 6

*2,4 - diamino - 5-p-chlorophenyl-6-alpha-ethyl-n-propylpyrimidine*

This compound was prepared as above from the corresponding keto-nitrile. Colorless prisms from benzene-petrol ether, M. P. 225°–228°.

EXAMPLE 7

*2,4-diamino-5-phenyl-6-methylpyrimidine*

The direct condensation of guanidine with alpha-acetylphenylacetonitrile and with ethyl alpha-acetylphenylacetate failed to give either the 2,4-diamino or the 2-amino-4-hydroxypyrimidine in appreciable quantity.

A solution of beta-methyl-beta-methoxy-alpha-phenyl acrylonitrile (8.0 g.) (from alpha-acetylphenylacetonitrile and diazomethane as in Example 2) in 100 ml. of ethanol was treated with a solution of guanidine (from 4.5 g. of the hydrochloride and 1.2 g. of sodium in 10 ml. of ethanol) and the mixture was heated on the steam bath for 16 hours. The alcohol was evaporated and after treatment with strong sodium hydroxide solution, the solid was filtered. It was purified by solution in aqueous acetic acid, precipitation with sodium hydroxide and finally by recrystallization from aqueous ethanol. The product (5.3 g.) melted at 249–51°.

The identical compound was prepared by the condensation of beta-methyl-beta-benzyloxy-alpha-phenylacrylonitrile with guanidine.

EXAMPLE 8

2,4-diamino-5-p-nitrophenyl-6-methylpyrimidine

The above pyrimidine (5 g.) was dissolved in concentrated sulfuric acid (40 ml.) and the solution cooled to −5°. Potassium nitrate (2.5 g.) was added in small portions over the course of about 1 hour with cooling and stirring of the solution. After an additional hour in the cold the mixture was poured over cracked ice and made alkaline with sodium hydroxide. After purification, the product was found to decompose above 350° but does not melt. (Analysis, N: Calc'd, 27.5; found, 28.0.)

EXAMPLE 9

2,4-diamino-5-p-chlorophenyl-6-n-amylpyrimidine

The condensation of beta-n-amyl-beta-methoxy-alpha-p-chlorophenylacrylonitrile (0.05 mol) and guanidine (from guanidine hydrochloride and sodium in alcohol) (0.05 mol) in alcoholic solution, as above, gave 2,4-diamino-5-p-chlorophenyl-6-n-amylpyrimidine in about 70% yield, reckoned from the ketonitrile. After recrystallization from ethanol it formed colorless needles, M. P. 188–90°.

EXAMPLE 10

2,4 - diamino - 5 - p - chlorophenyl-6-n-undecylpyrimidine

Alpha - lauryl - p-chlorophenylacetonitrile was treated with diazomethane in ethereal solution and the product was condensed with guanidine exactly as the corresponding acetyl derivative in Example 2. The material was isolated, after extraction with sodium hydroxide solution and recrystallized from methanol containing about 10% benzene. It formed plates, M. P. 139–140°. The yield calculated from the alpha-acylphenylacetonitrile was greater than 60%.

EXAMPLE 11

2,4-diamino-5-p-chlorophenyl-6-beta-phenethylpyrimidine

This compound was prepared as described above from beta-methoxy-beta-phenethyl-alpha-p-chlorophenylacrylonitrile and guanidine. It was purified in the usual way and recrystallized from methanol. It formed needles melting at 150–154°.

EXAMPLE 12

2,4-diamino - 5 - phenyl-6-(N-methyl-N-phenyl-aminomethyl)-pyrimidine

Phenylacetonitrile was condensed with N-phenyl-N-methylglycine ester in alcoholic solution with 1 molecular proportion of sodium ethylate. The product was treated with diazomethane in ethereal solution and without purification condensed with guanidine in alcoholic solution. The product was purified in the usual way and recrystallized from a mixture of benzene and petroleum ether. It melted at 150–152° and was obtained in approximately 50% yield.

EXAMPLE 13

2,4-diamino-5-o-chlorophenylpyrimidine

Neither alpha - formyl-o-chlorophenylacetonitrile nor ethyl alpha-formyl-o-chlorophenylacetate condensed with guanidine to give a pyrimidine in appreciable quantity.

When the formyl nitrile was treated with diazomethane as described above and then condensed with guanidine in the usual way, there was obtained in good yield 2,4-diamino-5-o-chlorophenylpyrimidine, M. P. 129–31°.

EXAMPLE 14

2,4 - diamino-5-alpha-naphthyl-6-methylpyrimidine

This derivative was prepared from beta-methoxy-beta-methyl-alpha-1-naphthyl acrylonitrile and guanidine. It melted at 159°–160° after recrystallization from benzene.

EXAMPLE 15

2,4-diamino-5-alpha-naphthylpyrimidine

By methylation of alpha-formylnaphthylacetonitrile with diazomethane and condensation of the product with guanidine in ethanolic solution, there was obtained 2,4-diamino-5-alpha naphthylpyrimidine in very high yield. After recrystallization from a mixture of benzene and petroleum ether it formed needles, melting at 179–80°.

EXAMPLE 16

2,4 - diamino-5-p-chlorophenyl-6-phenylpyrimidine

Ethylbenzoate was condensed with p-chlorophenylacetonitrile in the presence of sodium ethylate. The alpha-benzoyl-p-chlorophenylacetoacetate was treated with diazomethane in ethereal solution and the product condensed with guanidine in alcoholic solution. The product was purified in the usual way and recrystallized from ethanol. It melted at 268–70°.

EXAMPLE 17

2,4-diamino-5,6-diphenylpyrimidine a. Alpha - benzoylphenylacetonitrile (cyanodesoxybenzoin) was heated in alcoholic solution with 1 molecular proportion of guanidine under reflux for 16 hours. The alcohol was evaporated, the residue treated with strong sodium hydroxide solution and purified by solution in aqueous acetic acid and precipitation with sodium hydroxide. The small residue decomposed over the range 240–300°. Recrystallization from ethyl-alcohol gave a small amount of material melting at 133–4°.

b. Repetition of the above experiment gave a small amount of material melting at 227–235°.

Examination of the ultraviolet absorption spectra of the products from (a) and (b) above showed the absence of 2,4-diamino-5,6-diphenylpyrimidine, an authentic specimen of which was prepared as described in (c) below.

c. Cyanodesoxybenzoin was treated with diazomethane in the usual manner. After evaporation of the ether and excess diazomethane an alcoholic solution of guanidine was added and the mixture was heated on the steam bath for 4 hours. The resulting solution was evaporated and the residue worked up in the usual way. After recrystallization from ethanol the 2,4-diamino-5,6-diphenylpyrimidine melted at 241–2°. The ultraviolet absorption spectrum was consistent with the assigned structure. At pH 1.0, min. 268 mu, $E^{1\%}_{1cm.}$ 1,860 max. 292.5 mu, $E^{1\%}_{1cm.}$ 2,580 at pH 11.0, max. 238 mu, $E^{1\%}_{1cm.}$ 5,450 min. 280 mu, $E^{1\%}_{1cm.}$ 1,650 max. 300 mu.

$E^{1\%}_{1cm.}$ 2,420

EXAMPLE 18

*4-amino-5-phenylpyrimidine*

A mixture of approximately equimolar proportions of beta-methoxy-alpha-phenylacrylonitrile and formamidine (from the hydrochloride with sodium in alcohol) in alcoholic solution was boiled under reflux for 4 hours, the solution evaporated, and, after extraction with sodium hydroxide solution, the residue was dissolved in aqueous acetic acid and reprecipitated with sodium hydroxide solution, the residue was dissolved in aqueous acetic acid and reprecipitated with sodium hydroxide. After recrystallization from benzene, it was obtained as platelets melting at 152–5° and was identical with an authentic sample prepared by the method of Davies and Johnson (U. S. Patent No. 2,418,548).

EXAMPLE 19

*4-amino-6-methyl-5-phenylpyrimidine*

The condensation of beta-methoxy-beta-methyl-alphaphenylacrylonitrile with formamidine was carried out by heating of an alcoholic solution of approximately equimolar quantities of the two for 12 hours under a reflux condenser. The product was isolated as described above and recrystallized from benzene.

EXAMPLE 20

*4-amino-5-p-chlorophenyl-6-phenylpyrimidine*

Formamidine was heated in alcoholic solution with an approximately equimolar quantity of beta-phenyl-beta-methoxy-alpha-p-chlorophenylacrylonitrile (from alpha-benzoyl-p-chlorophenylacetonitrile and excess diazomethane in ether) for 6 hours. The product was worked up as in Example 17 and was recrystallized from benzene.

EXAMPLE 21

*4-amino-2-methyl-5-p-chlorophenylpyrimidine*

This substance was prepared by the condensation of approximately equimolar quantities of beta-ethoxy-alpha-p-chlorophenylacrylonitrile and acetamidine (from the hydrochloride with sodium in alcohol). The product was worked up as before and crystallized from aqueous ethanol. It melted at 177–9°.

EXAMPLE 22

*4-amino-5-p-chlorophenyl-2,6-dimethylpyrimidine*

This compound was prepared by the condensation of beta-methoxy-beta-methyl-alpha-p-chlorophenylacrylonitrile with acetamidine as in the previous example. It was recrystallized from a mixture of benzene and petroleum ether and then melted at 201–2°.

EXAMPLE 23

*4-amino-5-p-chlorophenyl-2-methyl-6-phenylpyrimidine*

Alpha-benzoyl-p-chlorophenylacetonitrile was treated in ethereal solution with a slight excess of diazomethane. After evaporation of the ether, alcohol and an alcoholic solution of acetamidine (from the alcoholic solution of the hydrochloride by addition of a solution of an equivalent amount of sodium in absolute ethanol) was added. The mixture was heated under reflux condenser for 7 hours, the alcohol was evaporated and the product was worked up in the usual way. It was recrystallized from benzene-alcohol mixture.

EXAMPLE 24

*4-amino-5-p-chlorophenyl-2-p-tolylpyrimidine*

The condensation of beta-methoxy-alpha-p-chlorophenylacrylonitrile and p-toluamidine was carried out in ethanolic solution by heating on the steam bath for 6 hours. The product was worked up in the usual way giving pale yellow prisms melting at 87–7°.

EXAMPLE 25

*4-amino-5-p-chlorophenyl-6-methyl-2-phenylpyrimidine*

Methylation of alpha-acetyl-p-chlorophenylacetonitrile with diazomethane gave beta-methoxy-beta-methyl-alpha-p-chlorophenylacrylonitrile which was condensed with benzamidine in the usual way giving 4-amino-5-p-chlorophenyl-6-methyl-2-phenylpyrimidine, isolated as in the examples above and recrystallized from benzene.

EXAMPLE 26

*4-amino-5-p-chlorophenyl-6-phenyl-2-p-tolylpyrimidine*

The above compound was prepared by treatment of alpha-benzoyl-p-chlorophenylacetonitrile with diazomethane and reaction of the product in alcohol with an approximately equimolar quantity of p-toluamidine under reflux for 6 hours. After evaporation and extraction of the residue with sodium hydroxide solution the substance was recrystallized from benzene.

We claim:

1. The process of preparing 4-amino-5-arylpyrimidines which consists of condensing an alpha-aryl-beta-alkoxy-acrylonitrile with a substance selected from the class consisting of guanidine and the amidines.

2. The process of preparing 4-amino-5-arylpyrimidines which comprises reacting an alpha-aryl-beta-alkoxy-acrylonitrile with an amidine and separating the resulting 4-amino-5-arylpyrimidine.

3. The process of preparing 5-aryl-2,4-diaminopyrimidines which comprises reacting a beta-alkoxy-alpha-aryl-acrylonitrile with guanidine and separating the resulting 5-aryl-2,4-diaminopyrimidine.

4. The process of preparing 5-aryl-2,4-diaminopyrimidines containing an alkyl substituent in the 6-position of the pyrimidine ring which comprises reacting an alpha-aryl-beta-alkyl-beta-alkoxy acrylonitrile with guanidine and separating the resulting 5-aryl-6-alkyl-2,4-diaminopyrimidine.

5. The process of preparing 2,4-diamino-5,6-diarylpyrimidines which comprises reacting a beta-alkoxy-alpha,beta-diarylacrylonitrile with guanidine and separating the 2,4-diamino-5,6-diarylpyrimidine.

6. The process of preparing 2-alkyl-4-amino-5-arylpyrimidines which comprises reacting a beta-alkoxy-alpha-aryl-acrylonitrile with an aliphatic amidine and separating the 2-alkyl-4-amino-5-arylpyrimidine.

7. The process of preparing 4-amino-5,6-diarylpyrimidines which comprises reacting a beta-alkoxy-alpha,beta-diarylacrylonitrile with formamidine and recovering the 4-amino-5,6-diarylpyrimidine.

8. The process of preparing 2,6-dialkyl-4-amino-5-arylpyrimidines which comprises reacting a beta-alkoxy-beta-alkyl-alpha-arylacrylonitrile with an aliphatic amidine and recovering the 2,6-dialkyl-4-amino-5-arylpyrimidine.

9. The process of preparing 4-amino-2,5-diarylpyrimidines which comprises reacting a beta-alkoxy-alpha-arylacrylonitrile with an aromatic amidine and separating the 4-amino-2,5-diarylpyrimidine.

GEORGE H. HITCHINGS.
PETER B. RUSSELL.
ELVIRA A. FALCO.

REFERENCES CITED

The following references are of record in the file of this patent:

UNITED STATES PATENTS

| Number | Name | Date |
| --- | --- | --- |
| 2,235,638 | Hromatka | Mar. 18, 1941 |

FOREIGN PATENTS

| Number | Country | Date |
| --- | --- | --- |
| 200,551 | Switzerland | Jan. 16, 1939 |

OTHER REFERENCES

Beilstein, Vierte Auflage, vol. 10, p. 755.